2,828,305
MANUFACTURE OF HYDROXYALKYL CELLULOSE ESTERS

John W. Mench, Rochester, N. Y., and Martin E. Rowley, Ann Arbor, Mich., assignors to Eastman Kodak Company, Rochester, N. Y., a corporation of New Jersey No Drawing. Application March 14, 1955
Serial No. 494,223

6 Claims. (Cl. 260—226)

This invention relates to a method for preparing hydroxyalkyl cellulose esters in which hydrolyzed lower fatty acid esters of cellulose are hydroxylated using an inorganic acid catalyst.

Hydroxyalkyl cellulose esters have been prepared previously by methods disclosed in the prior art. For instance, U. S. Patent No. 1,994,038 of Hagedorn describes a method for making these compounds in which hydroxyalkyl cellulose is acetylated such as with acetic anhydride and a catalyst or acetyl chloride and an organic base. The acetyl groups here apparently only displace cellulose hydroxyls that have not been previously displaced in the etherification process. In U. S. Patent No. 2,033,820 of Dreyfus cellulose acetate is prepared having 2–2½ acyl groups per $C_6$ cellulose unit. This material is hydroxyalkylated under severe conditions such as in an autoclave at an elevated temperature which apparently is necessary to replace cellulose hydroxyl groups with hydroxyalkyl radicals. U. S. Patent No. 2,051,219 of Malm and Fordyce describes a method of making cellulose compounds in which the cellulose is first esterified by replacing the hydroxyl groups of the cellulose with dicarboxylic acid radicals. The resulting compound is then subjected to the action of propylene oxide or the like at an elevated temperature which results in esterification of the second carboxyl of the dicarboxylic acid groups, the product obtained being a hydroxyalkyl ester of the dicarboxylic acid ester of cellulose; thus these compounds have no ether groupings therein.

One object of our invention is to prepare hydroxyalkyl cellulose esters in which the hydroxyl groups of the cellulose are primarily esterified and the remaining cellulose hydroxyl groups are then reacted with a hydroxyalkylating agent using an acid catalyst. Another object of our invention is to provide hydroxyalkylating conditions which do not hydrolyze the cellulose ester or which do not cause degradation of the cellulose. A further object of our invention is to provide a method of preparing hydroxyalkyl cellulose esters in which hydroxyls of the cellulose itself are replaced by hydroxyalkyl groups. A still further object of our invention is to provide a method for hydroxyalkylating cellulose esters under relatively mild conditions. Other objects will appear herein.

We have found that the cellulose hydroxyls of lower fatty acid esters of cellulose are readily hydroxyalkylated under relatively mild conditions by reacting upon the cellulose ester with a hydroxyalkylating agent in the presence of certain inorganic catalysts. Hydroxyalkylating agents which we have found to be useful for this purpose are propylene oxide, styrene oxide, epichlorhydrin, butylene oxide and ethylene oxide. The reaction of these materials with the hydroxyl groups of the cellulose ester is impelled by the use of an inorganic acid catalyst, the temperature employed being selected from the range of 20–65° C. Various combinations of catalysts and hydroxyalkylating agents are to be preferred to other combinations thereof. For instance, when reacting upon the hydroxyl groups of the cellulose ester with epichlorhydrin using boron trifluoride as the catalyst, the reaction takes place rapidly and hence temperatures in the lower part of the range given may be useful in hydroxyalkylating cellulose esters with that composition. We have found that the reaction of styrene oxide upon the hydroxyl groups of the cellulose ester is readily promoted by the use of sulfuric acid although boron trifluoride is also effective as the catalyst. When epichlororydrin is employed as the hydroxyalkylating agent, stannic chloride is useful as the catalyst, but the reaction proceeds more slowly than when a boron trifluoride catalyst is employed. Therefore, when stannic chloride is employed as the catalyst, one would ordinarily employ a reaction temperature in the upper part of the range given.

The starting materials which may be employed in processes in accordance with our invention are lower fatty acid esters of cellulose having .4–1.4 free and esterifiable hydroxyl groups per $C_6$ cellulose unit. Some of the esters which are useful in this connection are cellulose acetate, cellulose acetate propionate, cellulose acetate butyrate, cellulose propionate and cellulose butyrate. In the carrying out of the process in accordance with our invention the cellulose ester is first dissolved in an inert organic solvent selected to correspond to its solubility properties. For instance, if a cellulose acetate of high acetyl content is employed, methylene chloride would be useful as the solvent while with a cellulose acetate having not over 41% acetyl content, acetone or possibly methyl ethyl ketone would be useful. As the solvent with cellulose acetates having acetyl contents around 32–35%, dioxane would be useful as the solvent. The mixed esters mentioned exhibit more extensive solubility properties than cellulose acetate and, therefore, the solvents which may be employed in that case permit of a wider selection. After the cellulose ester is dissolved in the inert solvent the hydroxyalkylating agent and the catalyst selected are added. In the case of epichlorohydrin and boron trifluoride but an hour or two of reaction is necessary to obtain the final product. In the case of some of the other combinations disclosed a longer reaction time may be required and the use of a temperature in the upper part of the range given would be desirable.

The following examples illustrate the preparation of products which are useful as film formers, filaments, sizing agents, protective colloids or the like prepared in accordance with our invention.

Example 1

25 parts of cellulose acetate having an acetyl content of 32% (1.76 acetyl and 1.24 hydroxy groups per glucose unit) was dissolved in 150 parts of dioxane and 35.1 parts of 1,2-epoxy-ethylbenzene was added thereto. This solution was heated to 50° C. and 0.25 part of sulfuric acid in solution in 20 parts of dioxane was slowly stirred into the mass. The cellulose ester becomes hydroxyalkylated by maintaining the mass for 5 hours at 50° C. while continuing the agitation. The product thus obtained was isolated by diluting the mass with a mixture of acetone and water to render it readily flowable and then slowly adding to agitated distilled water. The solid product obtained is washed with methanol and upon drying the product is found to have an acetyl content of 25.3% and a phenylhydroxyethyl content of 21.4%.

Example 2

125 parts of cellulose acetate having an acetyl content of 32.8% (1.82 acetyl and 1.18 hydrxoyl groups per glucose unit) was dissolved in 750 parts of dioxane at 53° C. 10 parts of boron trifluoride-ethyl ether was dissolved in 100 parts of dioxane and was added to the cellulose acetate solution and following this there was slowly added to the stirred mass a solution of 156 parts of 1,2-epoxyethylbenzene in 330 parts of dioxane. The reaction mass was constantly stirred and maintained at approximately 53° C. Samples were isolated at various time intervals and were immersed with the following results:

| Reaction Time, Hours | Percent Acetyl | Percent Phenyl-hydroxy-ethyl | Intrinsic Viscosity in HOAc | Total Number of Hydroxyl Groups/g.u. |
|---|---|---|---|---|
| 1 | 30.7 | 5.8 | 1.70 | 1.20 |
| 2 | 30.6 | 6.7 | 1.85 | 1.18 |
| 4 | 30.0 | 8.1 | 1.70 | 1.19 |
| 6 | 29.7 | 9.2 | 1.57 | 1.19 |
| 23 | 29.0 | 13.0 | 1.20 | 1.14 |

The percent of phenylhydroxyethyl in the samples was determined by the absorbence of the phenyl grouping in the ultraviolet region at 258 mu. The measurements were made on solutions of the samples in methylene chloride:methanol (90:10) on a Beckman DU Spectrophotometer. The number of hydroxyl groups per glucose unit was determined by reaction of the products with phenyl isocyanate to yield carbanilates. There were quantitatively determined by their absorbence of 280 mu. The following equation illustrates the manner in which this reaction may occur. The relative proportions of the various groups indicated will vary appreciably depending upon the starting material used and the extent of hydroxyalkylation. For instance, when the reaction is carried out to completion substantially all of the hydroxy groups on the cellulose are hydroxyalkylated.

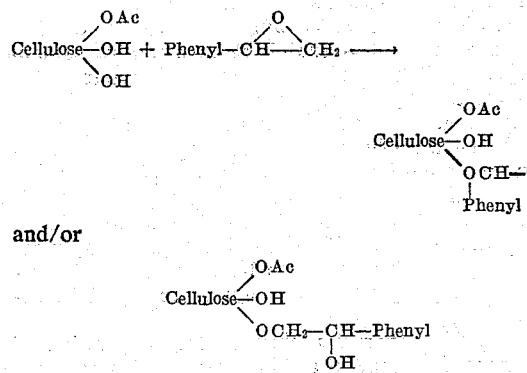

and/or

Example 3

25 parts of cellulose acetate having an acetyl content of 32.8% was dissolved in 250 parts of dioxane and a solution of .5 part of stannic chloride dissolved in 20 parts of dioxane was slowly added to the mass. The solution was brought to 53° C. by means of a water bath and 24 parts of epichlorohydrin was added to the stirred mass over a period of 5 minutes. After 17 hours the product was precipitated into and washed with distilled water. Analysis indicated the product obtained had a chlorohydroxypropyl content of 19.8%.

Example 4

125 parts of cellulose acetate having an acetyl content of 32% was dissolved in 1700 parts of dioxane. 10 parts of boron trifluoride-ethyl ether was dissolved in 100 parts of dioxane and this solution was slowly added to the cellulose ester solution which mass was then heated to 53° C. and a solution of 242 parts of epichlorohydrin in 700 parts of dioxane was slowly added to the stirred mass. The reaction mixture gelled but upon the further addition of 1000 parts of dioxane reverted to a good solution. The mass was agitated at approximately 53° C. for 2 hours. The product obtained was isolated by precipitating in distilled water and was washed and dried. Analysis indicated the product had a chlorohydroxypropyl content of 17.4% and an intrinsic viscosity of 1.34 in acetic acid.

Example 5

25 parts of cellulose acetate having an acetyl content of 32% was dissolved in 100 parts of dioxane at 53° C. and a solution of 2 parts of boron trifluoride-ethyl ether in solution in 20 parts of dioxane was mixed in. There was then slowly added to the stirred mass 45 parts of propylene oxide. A gel formed therefrom which redissolved upon adding 45 parts of dioxane. The mass was agitated for 5 hours at approximately 53° C. The product obtained was isolated in the manner described above. Analysis indicated a hydroxypropyl content of 13.7%.

The hydroxyalkyl cellulose esters obtained in accordance with our invention are useful for preparing products such as by dissolving in a solvent such as acetone or the like and extruding in the form of filaments or coating out onto a film forming surface to form sheeting thereon.

We claim:

1. A method of preparing hydroxyalkyl cellulose esters which comprises dissolving a hydrolyzed lower fatty acid ester of cellulose in an inert solvent therefor, adding thereto a hydroxyalkylating agent and a catalyst selected from the group consisting of boron trifluoride, sulfuric acid and stannic chloride, and maintaining the mass at 20–65° C. until a substantial hydroxyalkyl content is imparted to a cellulose ester.

2. A method of preparing a hydroxyalkyl cellulose ester which comprises dissolving partially hydrolyzed cellulose acetate in an inert solvent therefor, adding thereto propylene oxide and boron trifluoride catalyst and maintaining at 20–60° C. until a substantial hydroxyalkyl content has been imparted to the cellulose acetate.

3. A method of preparing a hydroxyalkyl cellulose ester which comprises dissolving partially hydrolyzed cellulose acetate in an inert solvent therefor, adding thereto epichlorohydrin and boron trifluoride catalyst and maintaining at 20–65° C. until a substantial hydroxyalkyl content has been imparted to the cellulose acetate.

4. A method of preparing a hydroxyalkyl cellulose ester which comprises dissolving partially hydrolyzed cellulose acetate in an inert solvent therefor, adding thereto epichlorohydrin and stannic chloride catalyst and maintaining at 20–65° C. until a substantial hydroxyalkyl content has been imparted to the cellulose acetate.

5. A method of preparing a hydroxyalkyl cellulose ester which comprises dissolving partially hydrolyzed cellulose acetate in an inert solvent therefor, adding thereto epoxyethyl benzene and boron trifluoride catalyst and maintaining at 20–65° C. until a substantial hydroxyalkyl content has been imparted to the cellulose acetate.

6. A method of preparing a hydroxyalkyl cellulose ester which comprises dissolving partially hydrolyzed cellulose acetate in an inert solvent therefor, adding thereto epoxyethyl benzene and sulfuric acid catalyst and maintaining at 20–65° C. until a substantial hydroxyalkyl content has been imparted to the cellulose acetate.

References Cited in the file of this patent

UNITED STATES PATENTS

| 2,033,820 | Dreyfus | Mar. 10, 1936 |
| 2,113,293 | Dickey | Apr. 5, 1938 |
| 2,423,883 | Fisher | July 15, 1947 |

U. S. DEPARTMENT OF COMMERCE
PATENT OFFICE

CERTIFICATE OF CORRECTION

Patent No. 2,828,305    John W. Mench et al.    March 25, 1958

It is hereby certified that error appears in the printed specification of the above numbered patent requiring correction and that the said Letters Patent should read as corrected below.

Column 1, line 16, for "hydroxylated" read -- hydroxyalkylated--; column 2, line 8, for "epichlororydrin" read -- epichlorohydrin --; line 68, for "hydrxoyl" read -- hydroxyl --; column 4, line 33, for "a cellulose" read -- the cellulose --; line 38, for "20-60° C." read -- 20-65° C. --.

Signed and sealed this 3rd day of June 1958.

(SEAL)
Attest:

KARL H. AXLINE
Attesting Officer

ROBERT C. WATSON
Commissioner of Patents